(12) United States Patent
Golpe et al.

(10) Patent No.: US 8,439,173 B2
(45) Date of Patent: May 14, 2013

(54) METHODS AND APPARATUS FOR A SUSPENSION SYSTEM WITH PROGRESSIVE RESISTANCE

(75) Inventors: William Golpe, Clinton Township, MI (US); Chandra S. Namuduri, Troy, MI (US); Walter B. Cwycyshyn, Pleasant Ridge, MI (US); Nikolai K. Moshchuk, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 624 days.

(21) Appl. No.: 12/238,078

(22) Filed: Sep. 25, 2008

(65) Prior Publication Data
US 2010/0072685 A1    Mar. 25, 2010

(51) Int. Cl.
*F16F 9/00*    (2006.01)
(52) U.S. Cl.
USPC ... 188/313; 188/282.5; 188/316; 188/322.13; 188/322.15; 188/322.22
(58) Field of Classification Search .............. 188/322.15, 188/322.13, 322.22, 282.5, 282.6, 282.7, 188/283, 313, 316, 317
See application file for complete search history.

(56) References Cited

U.S. PATENT DOCUMENTS

| | | | | |
|---|---|---|---|---|
| 4,352,417 A | * | 10/1982 | Stinson | 188/282.5 |
| 4,821,852 A | * | 4/1989 | Yokoya | 188/322.15 |
| 5,755,305 A | * | 5/1998 | Deferme et al. | 188/282.6 |
| 6,311,962 B1 | * | 11/2001 | Marking | 267/64.25 |
| 6,460,664 B1 | * | 10/2002 | Steed et al. | 188/322.15 |
| 6,540,052 B2 | * | 4/2003 | Fenn et al. | 188/322.15 |
| 6,622,832 B2 | * | 9/2003 | Ashiba et al. | 188/322.17 |
| 6,981,578 B2 | * | 1/2006 | Leiphart et al. | 188/322.14 |
| 2006/0243548 A1 | * | 11/2006 | Stein et al. | 188/266.1 |
| 2009/0107783 A1 | * | 4/2009 | Ota | 188/313 |

FOREIGN PATENT DOCUMENTS

JP    2007132359 A    *  5/2007

* cited by examiner

*Primary Examiner* — Robert A Siconolfi
*Assistant Examiner* — Mariano Sy
(74) *Attorney, Agent, or Firm* — Ingrassia Fisher & Lorenz, P.C.

(57) ABSTRACT

A suspension component achieves progressive resistance via a secondary bleed valve, which functions as a support for the primary compression valve at higher displacements, in conjunction with a secondary nonlinear spring element configured to alter the force on the piston at high displacements.

8 Claims, 2 Drawing Sheets

METHODS AND APPARATUS FOR A SUSPENSION SYSTEM WITH PROGRESSIVE RESISTANCE

TECHNICAL FIELD

The present invention generally relates to suspension systems of the type used, for example, with automotive vehicles. The invention more particularly relates to damping and shock absorbing components used in connection with such systems.

BACKGROUND

Motor vehicle suspension systems are configured to follow elevational changes in the road surface as the vehicle travels. When a bump or other rise in the road surface is encountered, the suspension system responds in "jounce," quickly moving upward relative to the frame of the vehicle. Similarly, when a dip in the road surface is encountered, the suspension responds in "rebound" such that the wheel moves downward relative to the frame of the vehicle.

During either a jounce or rebound event, a spring (e.g., a coil, leaf, or torsion spring) incorporated at the wheel provides a response to the resulting vertical movement. In order to prevent wheel bouncing and excessive vehicle body motion, however, a damper (i.e., shock absorber, strut, etc.) at the wheel dampens this motion.

Vehicle suspension engineering has traditionally focused on ride and handling as it pertains to body and wheel relative motion below about 1.5 m/s (meters per second). However, the suspension travel requirements in a vehicle are primarily driven by severe events, which can cause significant displacement of the wheel relative to the body. Such events, as when the vehicle encounters a deep and steep-walled pothole, can generate wheel velocities (relative to the body) of up to 9.0 m/s.

Progressive damping provides one strategy for reducing harsh impacts during severe events, and generally involves maintaining a predefined load in jounce and reducing engagement into the jounce suspension stop or other such structure. However, known progressive damping systems have thus far been unsuccessful in fully addressing the challenges posed by real-world road conditions.

For example, most gas-charged hydraulic dampers produce regressive resistance at higher velocities due to the limited pressure supported by the gas spring. Increased gas charge pressure increases seal friction, reducing durability and increasing ride harshness. Furthermore, During severe road events, insufficient pressure under the column of hydraulic oil prevents its flow through the piston, as the floating piston tends to move further than necessary to accommodate the changing volume, making the damper less capable of absorbing the input energy.

Accordingly, it is desirable to provide suspension systems that produce acceptable ride quality during routine conditions while accommodating severe road events. It is also desirable to reduce total jounce travel so that a given vehicle can be trimmed lower, thereby enabling competitive styling cues. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. The invention may be described herein in terms of functional and/or logical block components and various processing steps. It should be appreciated that such block components may be realized by any number of hardware, software, and/or firmware components configured to perform the specified functions. For the purposes of conciseness, conventional techniques and systems related to hydraulics, vehicle dynamics, and suspension systems are not described in detail herein.

In general, the various embodiments are directed to a suspension component that achieves progressive resistance via a secondary bleed valve, which functions as a support for the primary compression valve at higher displacements, in conjunction with a secondary nonlinear, solid annular spring element configured to alter the force on the piston at high displacements or velocities.

Figure 1:
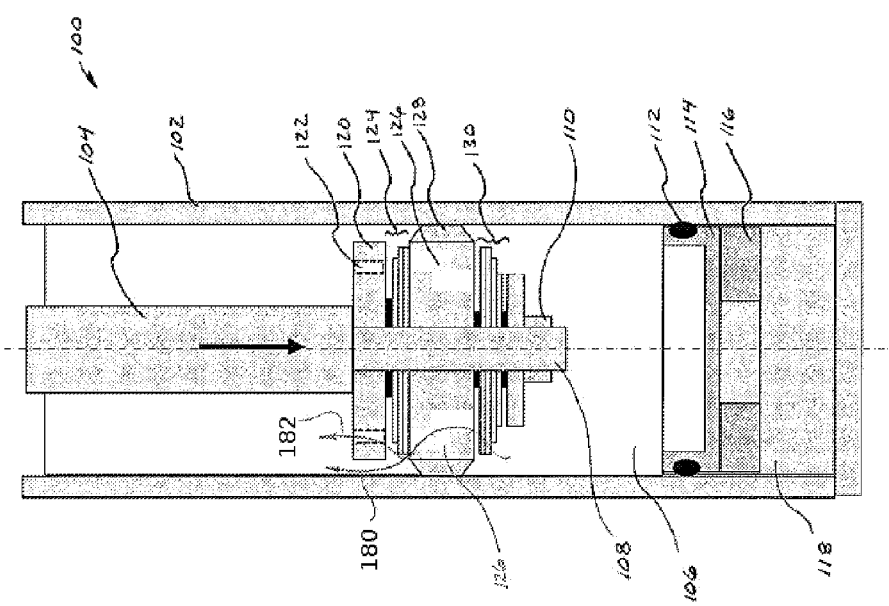
FIG. 1 depicts, in cross-section, various internal components of an exemplary suspension component in accordance with one embodiment.

FIG. 1 depicts a partial cross-sectional view of a suspension component in accordance with one embodiment of the present invention. It will be understood by those skilled in the art that this drawing is largely conceptual, and is simplified for the purposes of illustrating various salient features of the invention.

In general, suspension component 100 comprises a piston rod 104 configured to axially and reciprocally translate within a pressure tube 102 substantially filled with a hydraulic oil 106. A floating piston assembly 114 with associated seal 112, a secondary nonlinear, solid annular spring element (or "SNS") 116, and a gas charge 118 are provided within one end of pressure tube 102.

Coupled to, and coaxial with, piston rod 102 are various damping components extending along its length to distal end 108. In the illustrated embodiment, these components include secondary bleed valve/support (or "SBV") 120, a compression valve stack 124, a piston valve 128, and a rebound valve stack 130, all of which are secured via fastener (e.g., nut) 110. Compression valve stack 124, rebound valve stack, and piston valve 128 are sometimes collectively referred to herein as a "compression valve assembly."

SBV 120 includes a plurality of ports 122 extending there through. Similarly, piston valve 128 includes a plurality of ports 126. A multi-stage rather than a single-stage primary compression valve system as shown may also be employed.

Broadly speaking, piston valve 128 works in conjunction with compression valve stack 124 and rebound valve stack 130 to modulate the rate at which hydraulic oil 106 moves through ports 126 during a displacement event. Specifically, as is known, the various ring-like components within compression valve stack 124 deform elastically in response to the axial force applied along piston rod 104, and the degree of deformation controls to what extent fluid is inhibited from passing through ports 126, thereby producing a damping effect.

As illustrated, during a compression event, hydraulic oil 106 passes through ports 126 of piston valve 128 as well as through ports 122 (path 182) and around the outer diameter of SBV 120 (path 180). At the same time, floating piston assembly 114 translates up and down within the base of pressure tube 102 in response to the hydrodynamic pressure of hydraulic oil 106, and is restrained by both SNS 116 and gas charge 118.

In accordance with one aspect of the invention, progressive resistance is provided by suspension component 100 by virtue of the interplay of SBV 120 and SNS 116.

More particularly, SBV 120 is configured such that: (1) during normal ride control conditions, SBV 120 and its ports 122 act as a support for compression valve 124, but allow a sufficient volumetric rate of hydraulic oil 106 to pass therethrough such SBV 120 does not itself produce significant resistance to movement; and (2) during extreme, high-force conditions, SBV 120 functions as a support for compression valve stack 124, reducing deformation of the valve components due to its relatively high rigidity and restricting the movement of hydraulic oil.

Figure 3:
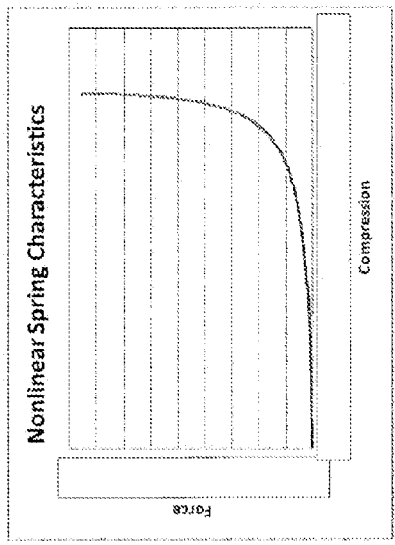
FIG. 3 is a qualitative graph showing the relationship between force and deformation for an exemplary non-linear spring.

At the same time, SNS 116 is configured to alter the effective pressure on piston rod 104 dynamically, and non-linearly, during high-displacement events. Referring momentarily to FIG. 3, an exemplary force/compression curve for a nonlinear spring useful in the context of the present invention is illustrated. As can be seen, unlike conventional linear springs, at higher compressions the force provided by the non-linear spring rises very quickly. SNS 116 may be integral with floating piston assembly 114 or may be an entirely separate element. The height of SNS 116 is preferably chosen such that at maximum compressed length of the system, the spring compression does not effect the static load significantly. At the same time, the maximum height of the secondary nonlinear spring is no greater than the ratio of the maximum displaced rod volume and the area of floating piston assembly 114.

The shape, size, and material properties of SNS 116, SBS 120, and valve stacks 124 and 130, may be selected to generate the optimum damping characteristics for any particular application. Such optimization may be carried out, for example, utilizing the methods described in related application U.S. patent application Ser. No. 11/939698, entitled "Suspension System with Optimized Damper Response," filed 14 Nov. 2007, which is hereby incorporated by reference.

In one embodiment, the secondary bleed valve has a diameter that is greater than approximately 90% of the inner diameter of the pressure tube.

Figure 2:
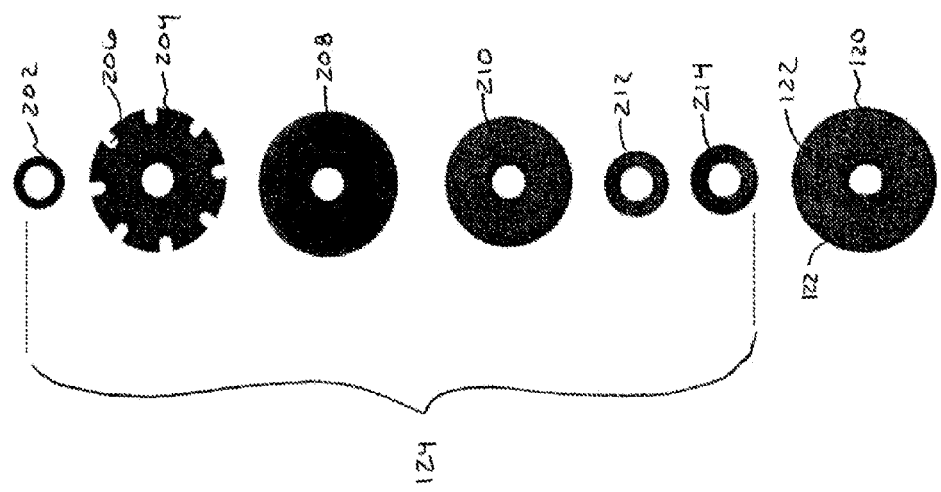
FIG. 2 depicts certain components of the suspension component of FIG. 1.

FIG. 2 depicts, in top view, various individual components shown in FIG. 1. It will be appreciated that the number, size, and shape of these components may vary, and that the invention is not so limited. As shown, compression valve stack 124 includes a series of rings or valve elements of varying diameters: i.e., elements 202, 204, 208, 210, 212, and 214. Element 204 preferably includes a series of notches 206 corresponding to the placement of respective ports 122 in SBV 120. These notches 204 facilitate the movement of hydraulic oil 106 therethrough. Rebound valve stack 130 (shown in FIG. 1) may comprise a similar series of conventional elements.

The resulting system achieves progressive resistance at higher velocities to maximize energy dissipation, thereby minimizing loads transmitted to the automobile structure. That is, the secondary bleed valve and the secondary nonlinear spring provide progressive resistance when the velocity of the piston rod with respect to the pressure tube is above a threshold value.

Figure 4:
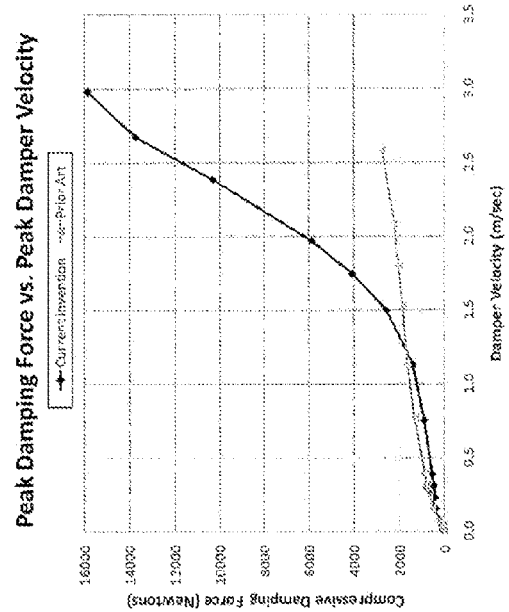
FIG. 4 is a graph showing example empirical results for a suspension component in accordance with one embodiment.

FIG. 4 is a graph showing compressive damping force (N) as a function of damper velocity (m/s) for an exemplary embodiment, superimposed on comparable data from a prior art system. As can be seen, while the prior art system exhibits a relatively linear and low damping force when the damper velocity exceeds approximately 1.5 m/s, a suspension component in accordance with the present invention exhibits increases in damping force at a greater rate. Empirical studies with such systems have shown that the measured structural load during a large pothole event may be reduced by approximately 20%.

While at least one example embodiment has been presented in the foregoing detailed description, it should be appreciated that a vast number of variations exist. For example, additional barrier layers may be incorporated in addition to the single layer illustrated. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. A suspension component comprising:
    a piston rod configured to reciprocally translate within a pressure tube at least partially filled with a hydraulic oil;
    a compression valve assembly coupled to the piston rod and in slideable contact with an inner wall of the pressure tube;
    a secondary bleed valve coupled to the piston rod and adjacent to the compression valve assembly, the secondary bleed valve including a plurality of ports for accommodating flow of the hydraulic oil during displacement of the piston rod;
    a gas charge chamber provided within a first end of the pressure tube;
    a secondary nonlinear, solid annular spring adjacent to the gas charge chamber; and
    a floating piston assembly adjacent to the secondary nonlinear, solid annular spring;
    wherein the secondary bleed valve and the secondary nonlinear, solid annular spring provide substantially nonlinear progressively increasing resistance when the velocity of the piston rod with respect to the pressure tube is above a threshold value;
    wherein the secondary nonlinear, solid annular spring has a height such that at a maximum compressed length of the suspension component, compression of the secondary nonlinear, solid annular spring does not substantially effect the static load on the suspension component; and
    wherein the secondary nonlinear, solid annular spring has a maximum height that is no greater than a ratio of a maximum displaced rod volume for the suspension component and an area of the floating piston assembly.

2. The suspension component of claim 1, wherein the plurality of ports includes a series of ports distributed at uniform angles.

3. The suspension component of claim 1, wherein the floating piston assembly and the secondary, solid annular nonlinear spring are rigidly coupled.

4. The suspension component of claim 1, wherein the secondary bleed valve has a diameter that is greater than approximately 90% of the inner diameter of the pressure tube.

5. A suspension component for use in an automobile, the suspension component comprising:
- a secondary bleed valve configured to reciprocally translate within a housing at least partially filled with hydraulic oil, the secondary bleed valve including a plurality of ports for accommodating flow the hydraulic oil during the reciprocal translation;
- a secondary nonlinear, solid annular spring coaxially situated with respect to the secondary bleed valve and in hydraulic communication with the secondary bleed valve such that the secondary bleed valve and the secondary nonlinear, solid annular spring provide substantially non-linear progressively increasing resistance when the velocity of the piston rod with respect to the pressure tube is above a threshold value, wherein the secondary nonlinear, solid annular spring has a height such that at a maximum compressed length of the suspension component, compression of the secondary nonlinear, solid annular spring does not substantially effect the static load on the suspension component;
- a floating piston assembly coaxial with the secondary bleed valve, wherein the secondary nonlinear, solid annular spring has a maximum height that is no greater than a ratio of a maximum displaced rod volume for the suspension component and an area of the floating piston assembly.

6. The suspension component of claim 5, wherein the plurality of ports includes a series of ports distributed at uniform angles.

7. The suspension component of claim 5, wherein the floating piston assembly and the secondary, solid annular nonlinear spring are rigidly coupled.

8. The suspension component of claim 5, wherein the secondary bleed valve has a diameter that is greater than approximately 75% of the inner diameter of the pressure tube.

* * * * *